(12) United States Patent
Spangler et al.

(10) Patent No.: US 10,294,823 B2
(45) Date of Patent: May 21, 2019

(54) DIRT EVACUATION DEVICES

(71) Applicant: UNITED TECHNOLOGIES CORPORATION, Farmington, CT (US)

(72) Inventors: Brandon Spangler, Vernon, CT (US); David J. Candelori, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 540 days.

(21) Appl. No.: 15/161,742

(22) Filed: May 23, 2016

(65) Prior Publication Data
US 2017/0335721 A1 Nov. 23, 2017

(51) Int. Cl.
*F02C 3/04* (2006.01)
*F01D 25/24* (2006.01)
*F01D 25/32* (2006.01)
*F01D 5/18* (2006.01)
*F01D 9/04* (2006.01)
*F01D 19/00* (2006.01)
*F01D 21/00* (2006.01)
*F01D 25/12* (2006.01)

(52) U.S. Cl.
CPC ............. *F01D 25/32* (2013.01); *F01D 5/187* (2013.01); *F01D 9/041* (2013.01); *F01D 19/00* (2013.01); *F01D 21/003* (2013.01); *F01D 25/12* (2013.01); *F01D 25/24* (2013.01); *F02C 3/04* (2013.01); *F05D 2220/32* (2013.01); *F05D 2260/202* (2013.01); *F05D 2260/607* (2013.01); *F05D 2260/85* (2013.01); *Y02T 50/675* (2013.01)

(58) Field of Classification Search
CPC .... F01D 25/32; F05D 2260/607; F04D 29/70; F04D 29/701
See application file for complete search history.

(56) References Cited

U.S. PATENT DOCUMENTS

| 7,326,031 B2* | 2/2008 | O'Neill | F01D 9/065 |
| | | | 415/115 |
| 7,581,397 B2* | 9/2009 | Strangman | F04D 29/441 |
| | | | 415/121.2 |
| 8,225,813 B2* | 7/2012 | Evanno | F02C 6/08 |
| | | | 137/468 |
| 2012/0177481 A1 | 7/2012 | Kojima et al. | |

OTHER PUBLICATIONS

EP Search Report dated Aug. 29, 2017 in EP Application No. 17161114.8.

* cited by examiner

*Primary Examiner* — Richard A Edgar
(74) *Attorney, Agent, or Firm* — Snell & Wilmer L.L.P.

(57) ABSTRACT

A system for reducing debris in a gas turbine engine includes a component that defines a component cooling channel for receiving a cooling airflow. The system also includes a casing at least partially enclosing the component. The system also includes a debris evacuation door coupled to the casing and having an open state in which the debris can exit the casing and a closed state.

19 Claims, 10 Drawing Sheets

E-E'
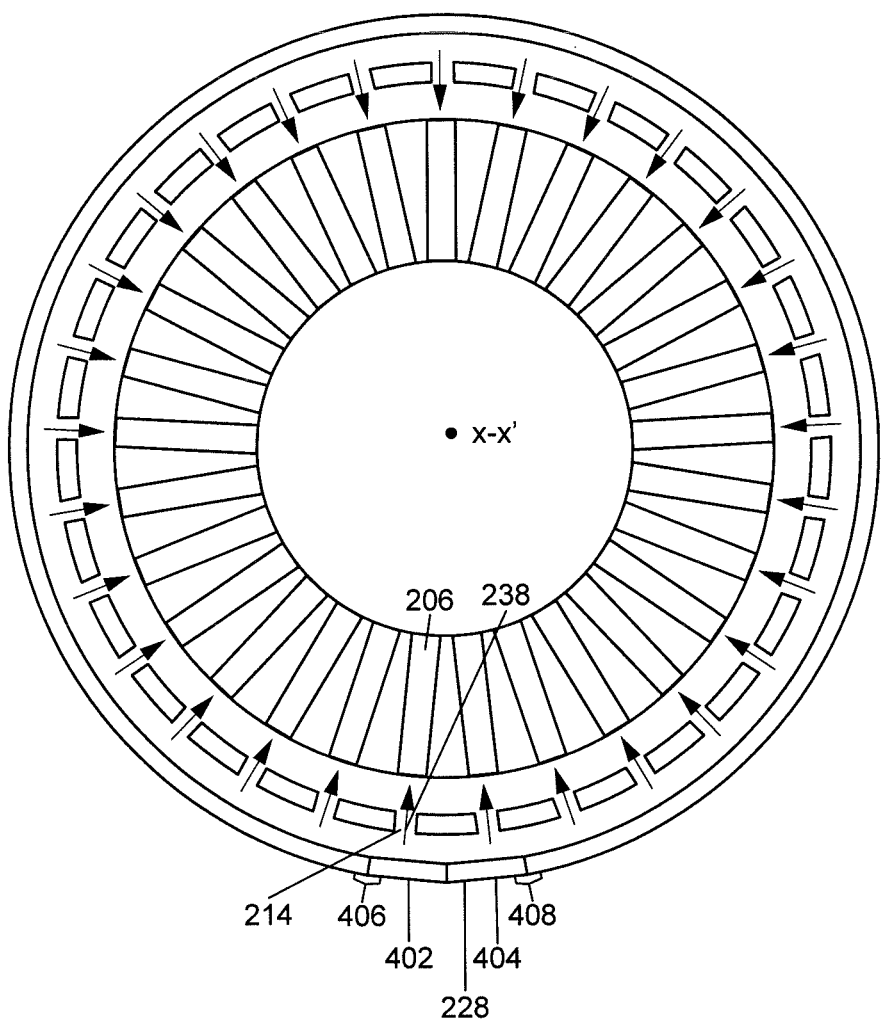
FIG.5
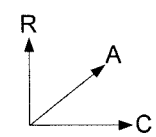

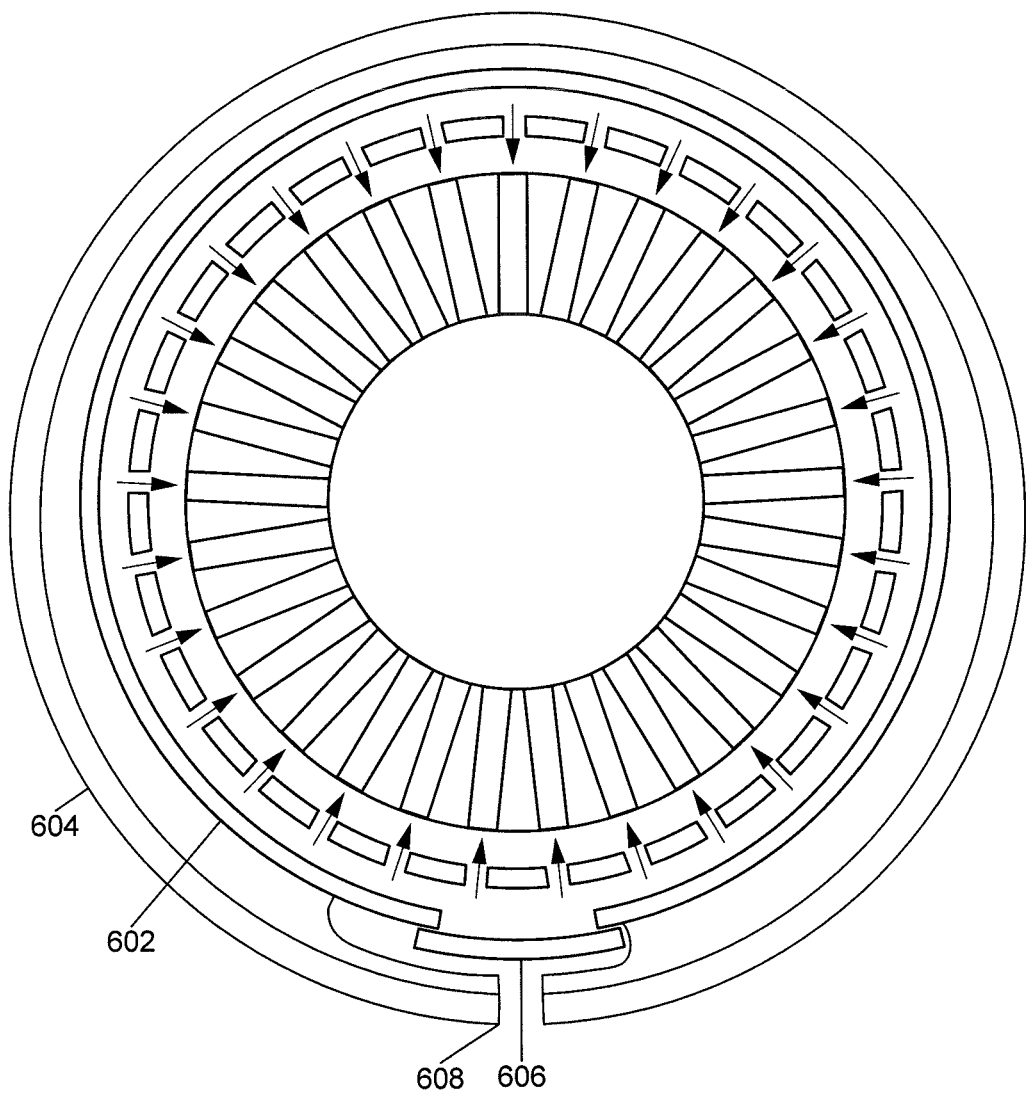
FIG.7
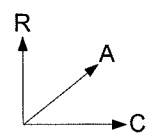

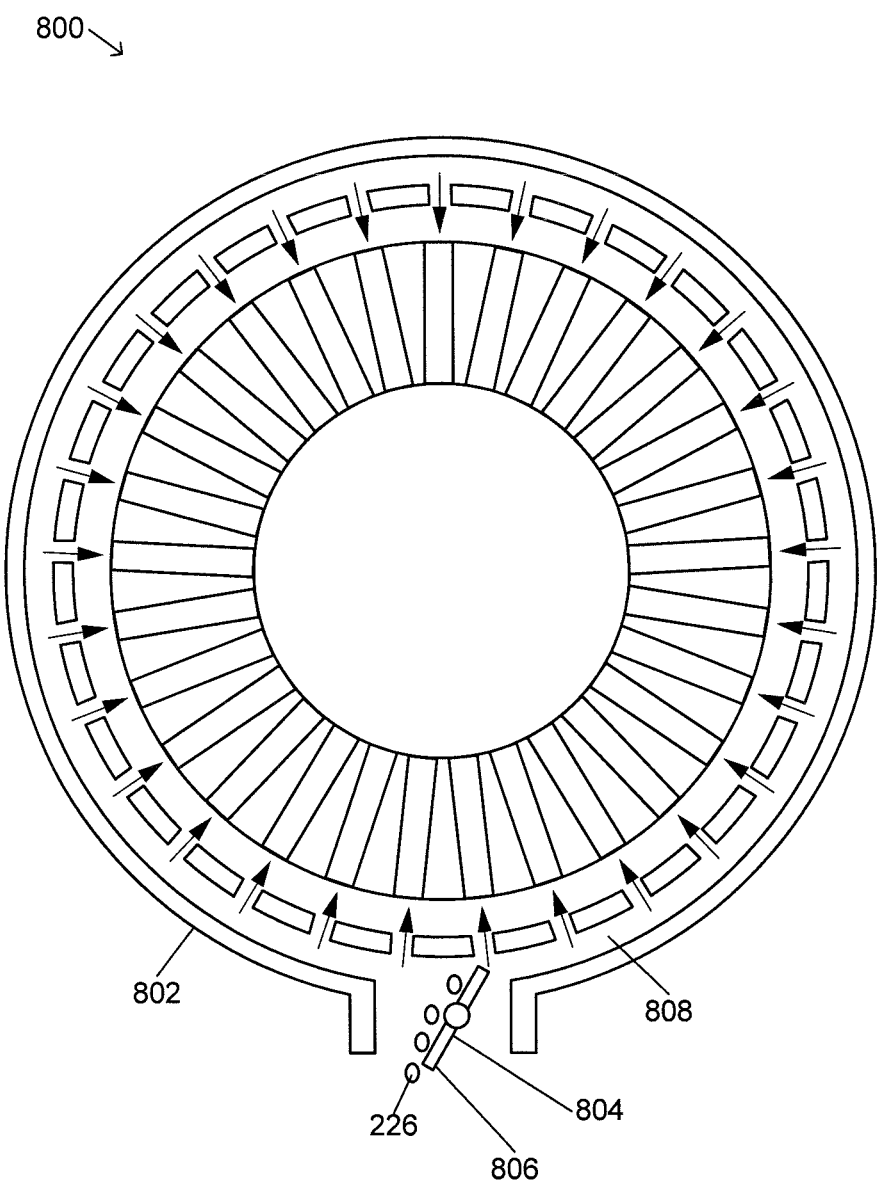
FIG.8A
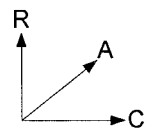

DIRT EVACUATION DEVICES

GOVERNMENT LICENSE RIGHTS

This disclosure was made with government support under F33657-98-D-0018, which was awarded by the United States Air Force. The government has certain rights in the disclosure.

FIELD

The present disclosure relates to a casing of a gas turbine engine.

BACKGROUND

Gas turbine engines, such as those that power modern commercial and military aircraft, may include a fan section to propel the aircraft, a compressor section to pressurize a supply of air from the fan section, a combustor section to burn fuel in the presence of the pressurized air, and a turbine section to extract energy from the resultant combustion gases and to generate thrust.

Aircraft having gas turbine engines are used throughout the world from humid jungles in South America to sandy deserts in the Middle East. Because gas turbine engines draw air from the environment, the composition of the air may vary based on the environment. When a gas turbine engine is in use in an environment with debris-filled air, such as in a sandy desert, the debris may be drawn into the gas turbine engine. The majority of this debris exits the gas turbine engine along with the core airflow. However, when the gas turbine engine comes to a stop, some debris may remain internally with the air. After a period of time, this debris can settle at the bottom of the engine compartment.

When the gas turbine engine is initialized, cooling air from the compressor section may be channeled to the turbine section and drawn into cooling holes of the turbine vanes. When the cooling air is drawn into the cooling holes, the debris at the bottom of the engine compartment is stirred. This debris may be drawn into the cooling holes along with the cooling air. More debris may be received by cooling holes of turbine vanes oriented at the bottom of the gas turbine engine. Over time, the debris may accumulate in the cooling holes of these lower turbine vanes, causing these lower vanes to have a shorter lifespan than vanes towards the top of the gas turbine engine.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Disclosed herein is a system in accordance with various embodiments for reducing debris in a gas turbine engine. The system includes a component that defines a component cooling channel for receiving a cooling airflow. The system also includes a casing at least partially enclosing the component. The system also includes a debris evacuation door coupled to the casing and having an open state in which the debris can exit the casing and a closed state.

In any of the foregoing systems, the debris evacuation door includes at least one of a hinged door, a sliding door, a valve, or a plug.

In any of the foregoing systems, the component includes at least one of a vane, a vane support, or a blade outer air seal (BOAS).

Any of the foregoing systems may also include a controller configured to control the debris evacuation door to switch from the open state to the closed state and to switch from the closed state to the open state.

In any of the foregoing systems, the controller is configured to control the debris evacuation door to be in the open state for at least a period of time after the gas turbine engine is initialized and before the gas turbine engine is at a ground idle state.

In any of the foregoing systems, the controller is configured to control the debris evacuation door to be in the open state for a predetermined amount of time and then to be in the closed state in response to the predetermined amount of time expiring.

Any of the foregoing systems may also include an input device coupled to the controller and configured to receive user input and the controller is further configured to control the debris evacuation door to be in the open state or the closed state based on the user input.

In any of the foregoing systems, the casing at least partially defines the component cooling channel.

In any of the foregoing systems, a pressure of pressurized air within the component cooling channel is greater than an ambient air pressure outside of the casing such that pressurized air within the component cooling channel forces the debris through the debris evacuation door in response to the debris evacuation door being in the open state.

In any of the foregoing systems, the gas turbine engine includes an axis and the debris evacuation door is axially aligned with an opening to the component cooling channel.

In any of the foregoing systems, the gas turbine engine includes an axis, the debris evacuation door is positioned in a high pressure turbine section of the gas turbine engine, and the debris evacuation door is located at a position along the axis at which the casing is at a largest radial distance from the axis relative to other locations in the high pressure turbine section.

Any of the foregoing systems may also include a nacelle at least partially enclosing the casing and an evacuation lead pipe coupled between the debris evacuation door and the nacelle and configured to channel the debris from the debris evacuation door through the nacelle to an area outside of the nacelle.

In any of the foregoing systems, the debris evacuation door is at least one of magnetized or configured to be switched between a magnetized state and a non-magnetized state.

Also described is a turbine section of a gas turbine engine. The turbine section includes at least one blade configured to generate torque in response to receiving an airflow. The turbine section also includes a component defining a component cooling channel for receiving a cooling airflow. The system also includes a casing at least partially enclosing the component. The system also includes a debris evacuation door coupled to the casing and having an open state in which debris can exit the casing and a closed state.

In any of the foregoing turbine sections, the debris evacuation door includes at least one of a hinged door, a sliding door, a valve, or a plug.

Any of the foregoing turbine sections may also include a controller configured to control the debris evacuation door to be in the open state for at least a period of time after the gas turbine engine is initialized and before the gas turbine engine is at a ground idle state.

In any of the foregoing turbine sections, the casing at least partially defines the component cooling channel and a pressure of pressurized air within the component cooling channel is greater than an ambient air pressure outside of the casing such that pressurized air within the component cooling channel forces the debris through the debris evacuation door in response to the debris evacuation door being in the open state.

Also described is a method for removing debris from a turbine section of a gas turbine engine. The method includes determining, by a controller, that the debris should be removed from the turbine section of the gas turbine engine. The method also includes controlling, by the controller, a debris evacuation door coupled to a casing of the gas turbine engine to be in an open state in which the debris can exit the casing in response to determining that the debris should be removed. The method also includes controlling, by the controller, the debris evacuation door to be in a closed state in response to at least one of receiving a user input or expiration of a predetermined amount of time.

In any of the foregoing methods, determining that the debris should be removed further includes determining, by the controller, that at least one of the gas turbine engine is initializing or a request has been made to initialize the gas turbine engine.

Any of the foregoing methods may also include controlling, by the controller, the debris evacuation door to switch to a non-magnetized state in response to determining that the debris should be removed.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows:

FIG. 5 is an axial view of the debris evacuation door of FIG. 4 in a closed state, in accordance with various embodiments;

FIG. 7 is an axial view of the debris evacuation door of FIG. 6 in a closed state, in accordance with various embodiments;

FIG. 8A is an axial view of a turbine section of a gas turbine engine with a valve used as a debris evacuation door in an open state, in accordance with various embodiments;

DETAILED DESCRIPTION

Figure 1:
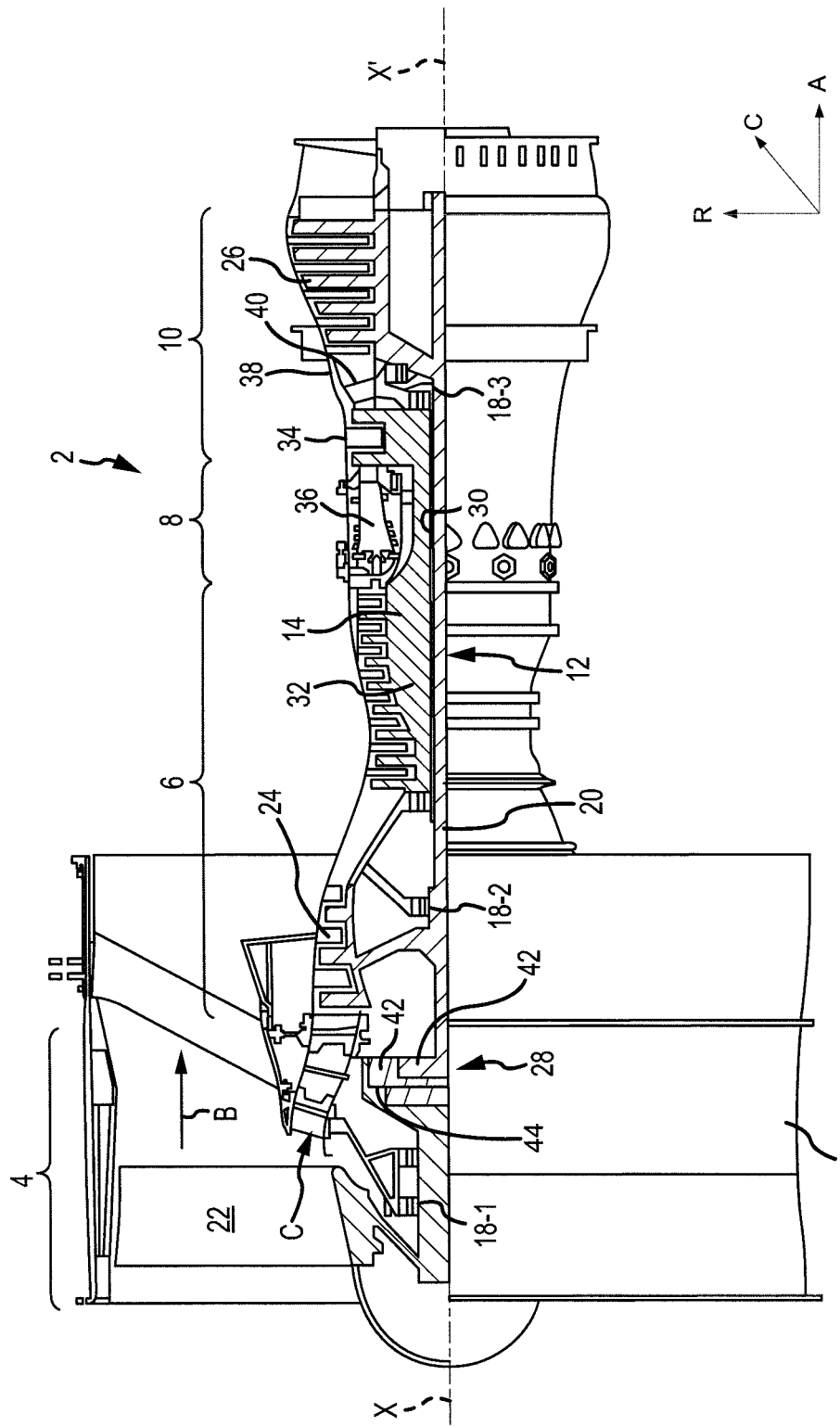
FIG. 1 is a schematic cross-section of a gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned along the longitudinal axis of the gas turbine engine at a greater distance in the aft or forward direction away from the longitudinal center of the gas turbine than the second component. A first component that is "axially inward" of a second component means that the first component is positioned along the longitudinal axis of the gas turbine engine closer to the longitudinal center of the gas turbine than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. An A-R-C axis is shown throughout the drawings to illustrate the axial, radial and circumferential directions.

In various embodiments and with reference to FIG. 1, an exemplary gas turbine engine 2 is provided. Gas turbine engine 2 may be a two-spool turbofan that generally incorporates a fan section 4, a compressor section 6, a combustor section 8 and a turbine section 10. Alternative engines may include, for example, an augmentor section among other systems or features. In operation, fan section 4 can drive air along a bypass flow-path B while compressor section 6 can drive air along a core flow-path C for compression and communication into combustor section 8 then expansion through turbine section 10. Although depicted as a turbofan gas turbine engine 2 herein, it should be understood that the concepts described herein are not limited to use with turbofans as the teachings may be applied to other types of turbine engines including three-spool architectures.

Gas turbine engine 2 may generally comprise a low speed spool 12 and a high speed spool 14 mounted for rotation about an engine central longitudinal axis X-X' relative to an engine static structure 16 via several bearing systems 18-1, 18-2, and 18-3. It should be understood that various bearing systems at various locations may alternatively or additionally be provided, including for example, bearing system 18-1, bearing system 18-2, and bearing system 18-3.

Low speed spool 12 may generally comprise an inner shaft 20 that interconnects a fan 22, a low pressure compressor section 24 (e.g., a first compressor section) and a low pressure turbine section 26 (e.g., a second turbine section). Inner shaft 20 may be connected to fan 22 through a geared architecture 28 that can drive the fan 22 at a lower speed than low speed spool 12. Geared architecture 28 may comprise a gear assembly 42 enclosed within a gear housing 44. Gear assembly 42 couples the inner shaft 20 to a rotating fan structure. High speed spool 14 may comprise an outer shaft 30 that interconnects a high pressure compressor section 32 (e.g., second compressor section) and high pressure turbine section 34 (e.g., first turbine section). A combustor 36 may be located between high pressure compressor section 32 and high pressure turbine section 34. A mid-turbine frame 38 of engine static structure 16 may be located generally between high pressure turbine section 34 and low pressure turbine section 26. Mid-turbine frame 38 may support one or more bearing systems 18 (such as 18-3) in turbine section 10. Inner shaft 20 and outer shaft 30 may be concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C may be compressed by low pressure compressor section 24 then high pressure compressor section 32, mixed and burned with fuel in combustor 36, then expanded over high pressure turbine section 34 and low pressure turbine section 26. Mid-turbine frame 38 includes airfoils 40, which are in the core airflow path. Turbines 26, 34 rotationally drive the respective low speed spool 12 and high speed spool 14 in response to the expansion.

Gas turbine engine 2 may be, for example, a high-bypass geared aircraft engine. In various embodiments, the bypass ratio of gas turbine engine 2 may be greater than about six (6). In various embodiments, the bypass ratio of gas turbine engine 2 may be greater than ten (10). In various embodiments, geared architecture 28 may be an epicyclic gear train, such as a star gear system (sun gear in meshing engagement with a plurality of star gears supported by a carrier and in meshing engagement with a ring gear) or other gear system.

Geared architecture 28 may have a gear reduction ratio of greater than about 2.3 and low pressure turbine section 26 may have a pressure ratio that is greater than about 5. In various embodiments, the bypass ratio of gas turbine engine 2 is greater than about ten (10:1). In various embodiments, the diameter of fan 22 may be significantly larger than that of the low pressure compressor section 24, and the low pressure turbine section 26 may have a pressure ratio that is greater than about 5:1. The pressure ratio of low pressure turbine section 26 may be measured prior to inlet of low pressure turbine section 26 as related to the pressure at the outlet of low pressure turbine section 26 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency, which may be associated with higher pressure ratios and higher temperatures in the high speed spool 14. These higher operating temperatures and pressure ratios may create operating environments that may cause thermal loads that are higher than thermal loads conventionally encountered, which may shorten the operational life of current components. In various embodiments, operating conditions in high pressure compressor section 32 may be approximately 1400 degrees Fahrenheit (1400° F., approximately 760° C.) or more, and operating conditions in combustor 36 may be higher.

In various embodiments, combustor section 8 may comprise one or more combustor 36. As mentioned, the core airflow C may be compressed, then mixed with fuel and ignited in the combustor 36 to produce high speed exhaust gases.

Figure 2:
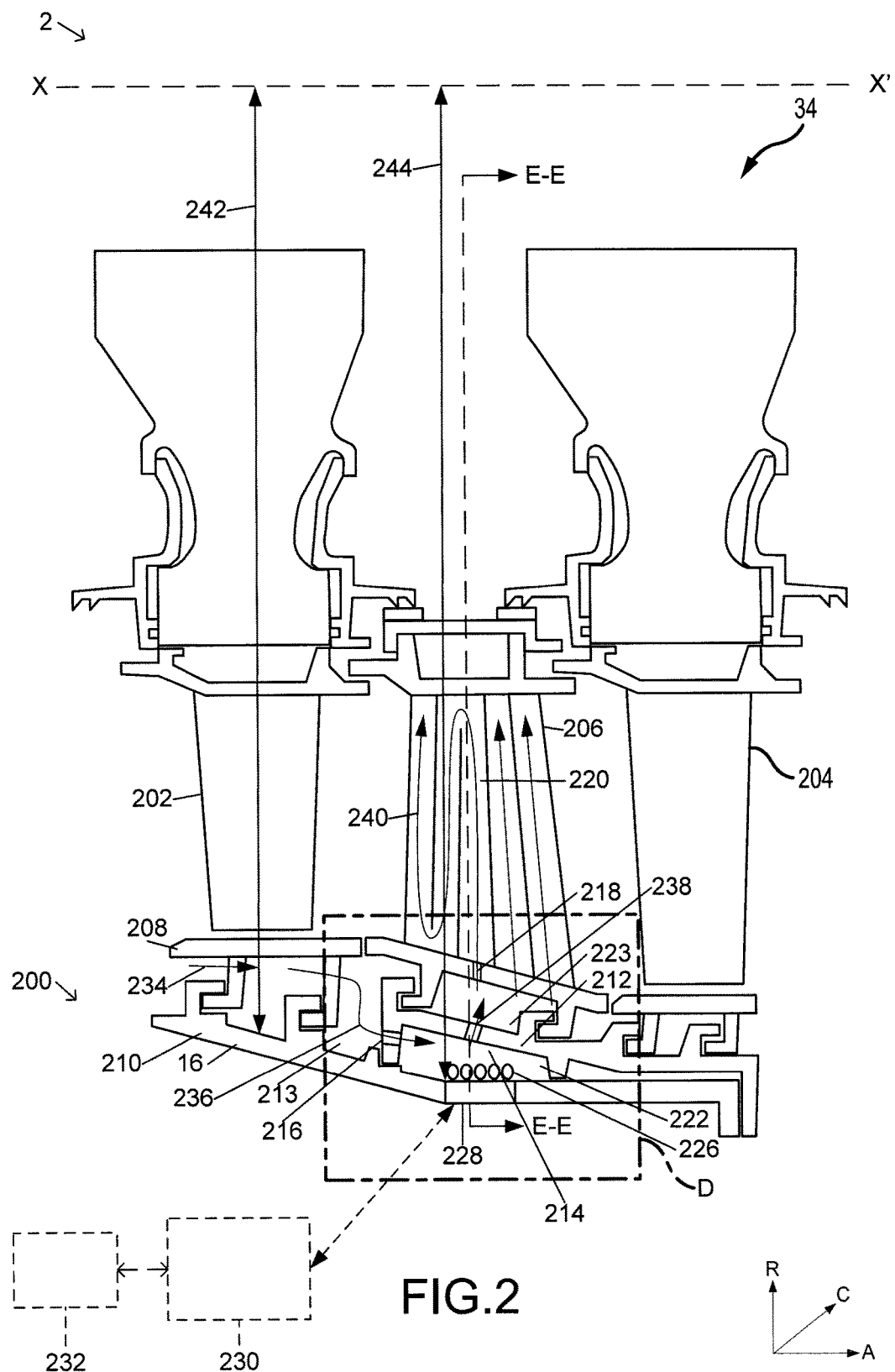
FIG. 2 is a view of a portion of a turbine section of the gas turbine engine of FIG. 1, in accordance with various embodiments.

Turning to FIG. 2, a portion of high pressure turbine section 34 is shown. High pressure turbine section 34 includes a first blade 202, a second blade 204 and a vane 206 positioned axially between first blade 202 and second blade 204. When the core airflow is received by high pressure turbine section 34, the airflow causes first blade 202 and second blade 204 to rotate, thus generating torque. Air flowing past first blade 202 is received by vane 206 which turns the airflow towards second blade 204.

Static structure 16 may include one or more casing 210. Casing 210 is fixed relative to axis of rotation X-X'. A blade outer air seal (BOAS) 208 is coupled to casing 210. A vane support 212 may also be in contact with, or coupled to, casing 210. Vane 206 may be coupled to vane support 212.

In operation, high pressure turbine section 34 may be exposed to relatively high pressures and temperatures. In that regard, it is desirable for components of high pressure turbine section 34 to be cooled via cooling air. As shown by arrows 234 and 236, cooling airflow may flow via an upstream cooling channel 213 to a component cooling channel 214. The component cooling channel 214 is defined by the area between the component and the casing. As illustrated, the component cooling channel 214 for the vane 206 includes a first portion defined between casing 210 and vane support 212, referred to as a support cavity 222, and a second portion between the vane and the vane support 212, referred to as the vane outer diameter cavity 223. In various embodiments, an upstream cooling channel can include any channel upstream of a component cooling channel through which a cooling airflow may travel. A first channel is "upstream" from a second channel where fluid flows through the first channel before flowing through the second channel during normal operation.

Component cooling channel 214 may receive the cooling airflow at an opening 216 via the upstream cooling channel 213. The cooling airflow may then flow through vane support 212 and be received within vane outer diameter cavity 223. From vane outer diameter cavity 223, the cooling airflow may be received by one or more vane cooling aperture 218 of vane 206. Vane cooling aperture 218 may be in fluid communication with a vane cooling channel 220 that flows through at least a portion of vane 206. The cooling airflow may flow throughout vane 206 as shown by arrow 240, thus reducing a temperature of vane 206.

In various embodiments, BOAS 208 may also define a component cooling channel. In that regard, reference to a component cooling channel of a component may refer to component cooling channel 214 of vane support 212, a cooling channel of BOAS 208 and/or vane cooling aperture 218 of vane 206.

In various situations and referring to FIGS. 1 and 2, debris may occasionally enter gas turbine engine 2 via intake air. The majority of debris that enters gas turbine engine 2 bypasses the engine core via bypass flow-path B or flows through core flow-path C and exits gas turbine engine 2. In various embodiments, however, debris may remain within gas turbine engine 2 after gas turbine engine 2 has been turned off. After a period of time, this debris may settle at a bottom of gas turbine engine 2. Where used herein, bottom refers to the part of gas turbine engine 2 that is nearest to the ground when gas turbine engine 2 is at rest.

Returning reference to FIG. 2, debris 226 may settle against the bottom of casing 210 (i.e., the portion of casing 210 associated with the negative-R direction). When gas turbine engine 2 is started, debris 226 may become unsettled and mix with air in the cooling airflow. Debris 226 may be received by vane cooling apertures of vanes within high pressure turbine section 34. The majority of debris 226 that becomes unsettled upon startup of gas turbine engine 2 may be received by vane cooling apertures of vanes nearest the bottom of gas turbine engine 2, such as vane cooling aperture 218 of vane 206. This may cause vanes towards the bottom of gas turbine engine 2 to have a shorter lifespan than vanes farther from the bottom of gas turbine engine 2.

Debris removed from high pressure turbine section 34 may not mix with cooling airflow and, thus, may not be received by vane cooling apertures. In order to remove debris 226 prior to debris 226 mixing with the cooling airflow, high pressure turbine section 34 may include one or more debris evacuation door 228. Debris evacuation door 228 may be opened at a point in time between gas turbine engine 2 being turned off and gas turbine engine being turned on and reaching a ground idle state. In various embodiments, it is desirable for debris evacuation door 228 to be opened for at least a period of time after gas turbine engine 2 has been initialized and before gas turbine engine 2 is at the ground idle state.

Figure 3:
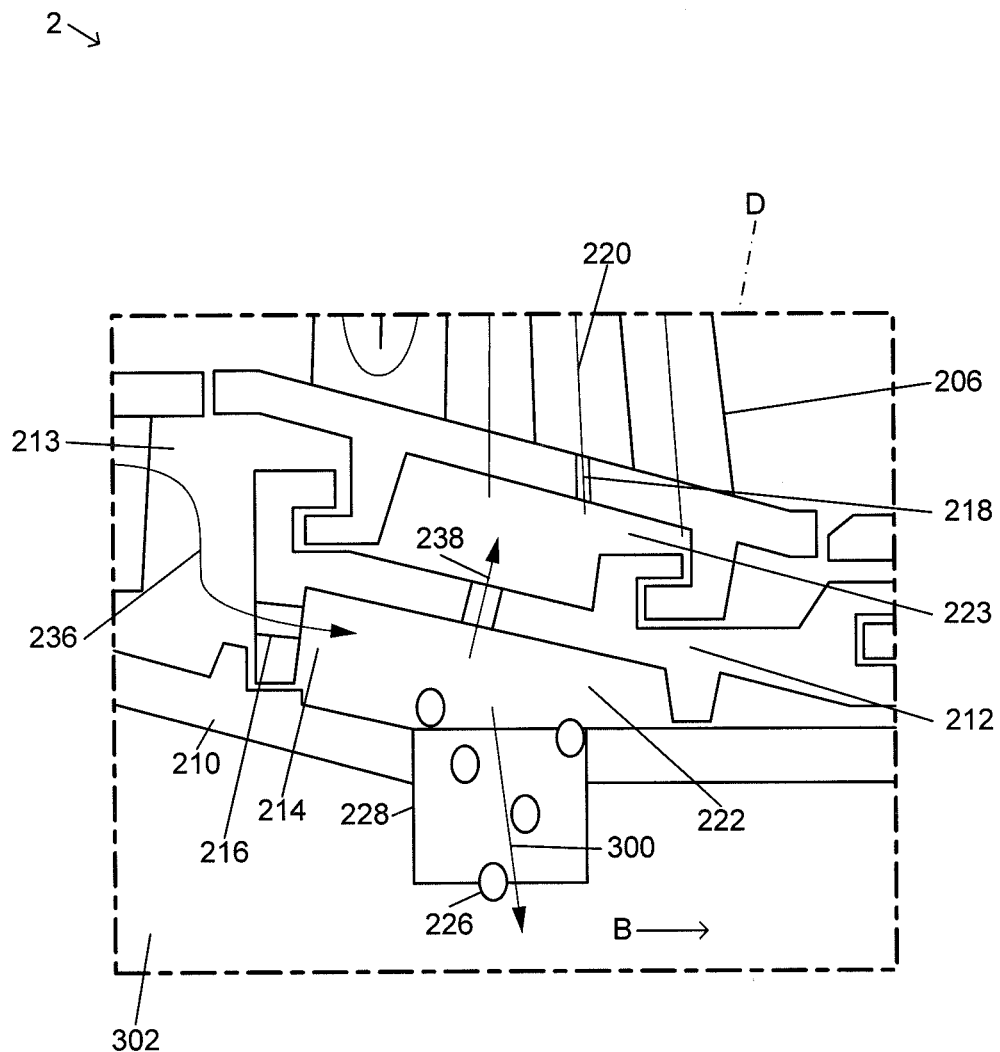
FIG. 3 is an enlarged view of a debris evacuation door of the turbine section shown in FIG. 2, in accordance with various embodiments.

Referring briefly to FIG. 3, debris evacuation door 228 is in an open state and gas turbine engine 2 has been started but is not yet at the ground idle state. The cooling airflow is received by support cavity 222, resulting in air pressure within support cavity 222 being greater than ambient air pressure in an area 302 outside of casing 210. Thus, the pressurized air in support cavity 222 forces debris 226 out support cavity 222 via debris evacuation door 228 and into area 302 outside of casing 210.

In various embodiments, it is desirable for debris evacuation door 228 to be positioned at the bottom of casing 210, although the doors may be located anywhere about the circumference. This placement at the bottom of casing 210 allows gravity to force at least a portion of debris 226 into area 302. By forcing debris 226 into area 302, the amount of debris 226 that may be received by vane 206 is reduced.

Returning reference to FIG. 2, a controller 230 may be coupled to debris evacuation door 228. Controller 230 may be designed to control operation of debris evacuation door 228 between a closed state, as shown in FIG. 2, and the open state, as shown in FIG. 3. In various embodiments, controller 230 may determine when initialization of gas turbine engine 2 is forthcoming, and in various embodiments, controller 230 may determine when gas turbine engine 2 has been initialized. For example, controller 230 may receive a signal from a device indicating that an initialization sequence of gas turbine engine 2 has begun.

An input device 232 may be coupled to controller 230. In some embodiments, input device 232 may be directly coupled to debris evacuation door 228. Input device 232 may receive user input corresponding to a request to cause debris evacuation door 228 to switch from the open state to the closed state, or to switch from the close to state to the open state. In some embodiments, a user may provide input via the input device 232 indicating that gas turbine engine 2 will be initialized. In response to receiving such input, controller 230 may cause debris evacuation door 228 to switch to the open state in order to evacuate debris 226.

In various embodiments, it may be more desirable for debris 226 that is axially aligned with component cooling channel 214 to be evacuated than for debris 226 that is not aligned with component cooling channel 214 to be evacuated. In that regard, debris evacuation door 228 may be at least partially axially aligned with opening 216 to component cooling channel 214.

In various embodiments, one or more debris evacuation doors, such as debris evacuation door 228, may be axially aligned with each component cooling channel within high pressure turbine section 34. In various embodiments, high pressure turbine section 34 may include one or more debris evacuation doors that are each axially aligned with multiple components. For example, a debris evacuation door may extend from component cooling channel 214 to a component cooling channel of BOAS 208.

In various embodiments, one or more debris evacuation doors may be placed at an axial location within high pressure turbine section 34 at which a radial distance between the casing 210 and axis X-X' is the greatest. For example, an axial location of casing 210 aligned with BOAS 208 has a first radial distance 242 and an axial location along casing 210 that is aligned with vane 206 has a second radial distance 244 that is greater than first radial distance 242. In this configuration, when debris 226 settles at the bottom of casing 210, more debris may settle at the axial location that has the largest radial distance (i.e., second radial distance 244) as gravity may cause debris from the axial location not having the largest radial distance to move towards the axial location that has the largest radial distance.

In various embodiments and referring briefly to FIG. 1, debris evacuation doors may also be used in other components of gas turbine engine 2, such as low pressure turbine section 26, compressor section 6 or the like.

Figure 4:
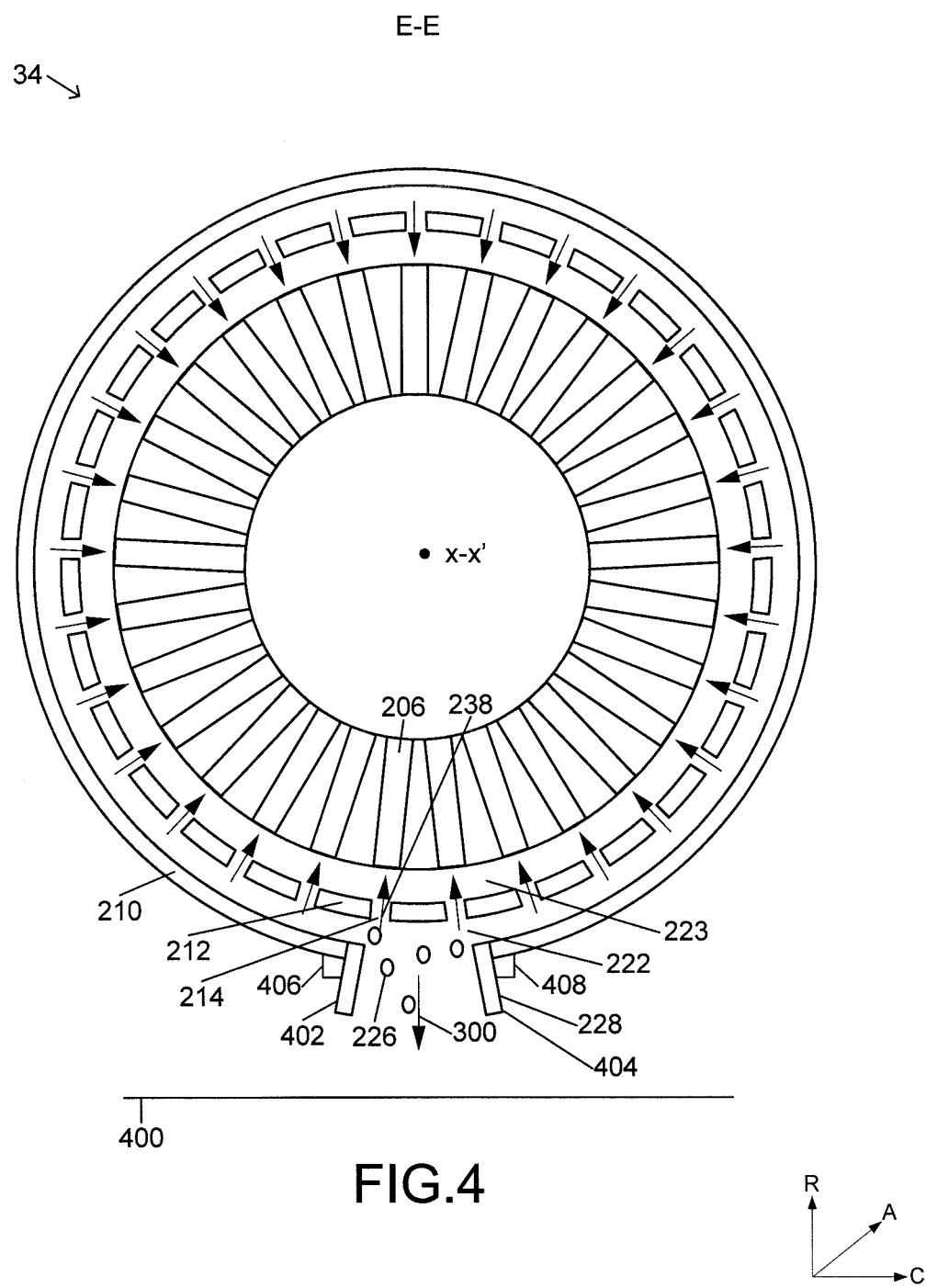
FIG. 4 is an axial view of the debris evacuation door of FIG. 3 in an open state, in accordance with various embodiments.

Turning now to FIG. 4, a cross-sectional view of a portion of high pressure turbine section 34 along axis X-X' (i.e., along the axial axis) is shown. Debris evacuation door 228 is positioned at the bottom of casing 210. Stated differently, debris evacuation door 228 is positioned at a circumferential location along casing 210 that is nearest to a ground surface 400.

Debris evacuation door 228 is shown in the open state. Because debris evacuation door 228 is positioned at the circumferential location along casing 210 nearest to ground surface 400, gravity causes debris 226 to fall from debris evacuation door 228 out turbine section 34 and towards ground surface 400. In various embodiments, pressure within support cavity 222 may be greater than pressure outside of casing 210. This pressure differential may further force debris 226 out of gas turbine engine 2 towards ground surface 400.

Debris evacuation door 228 includes two hinged doors and two actuators. A first actuator 406 is coupled to a first hinged door 402 and a second actuator 408 is coupled to a second hinged door 404. In various embodiments, a debris evacuation door may include any number of hinged doors and/or actuators.

Referring briefly to FIGS. 2, 4 and 5, controller 230 may be coupled to actuator 406 and actuator 408. Based on logic or user input, controller 230 may control actuator 406 and/or actuator 408 to move first hinged door 402 and/or second hinged door 404 between the closed state, as shown in FIG. 5, and the open state, as shown in FIG. 4.

Figure 6:
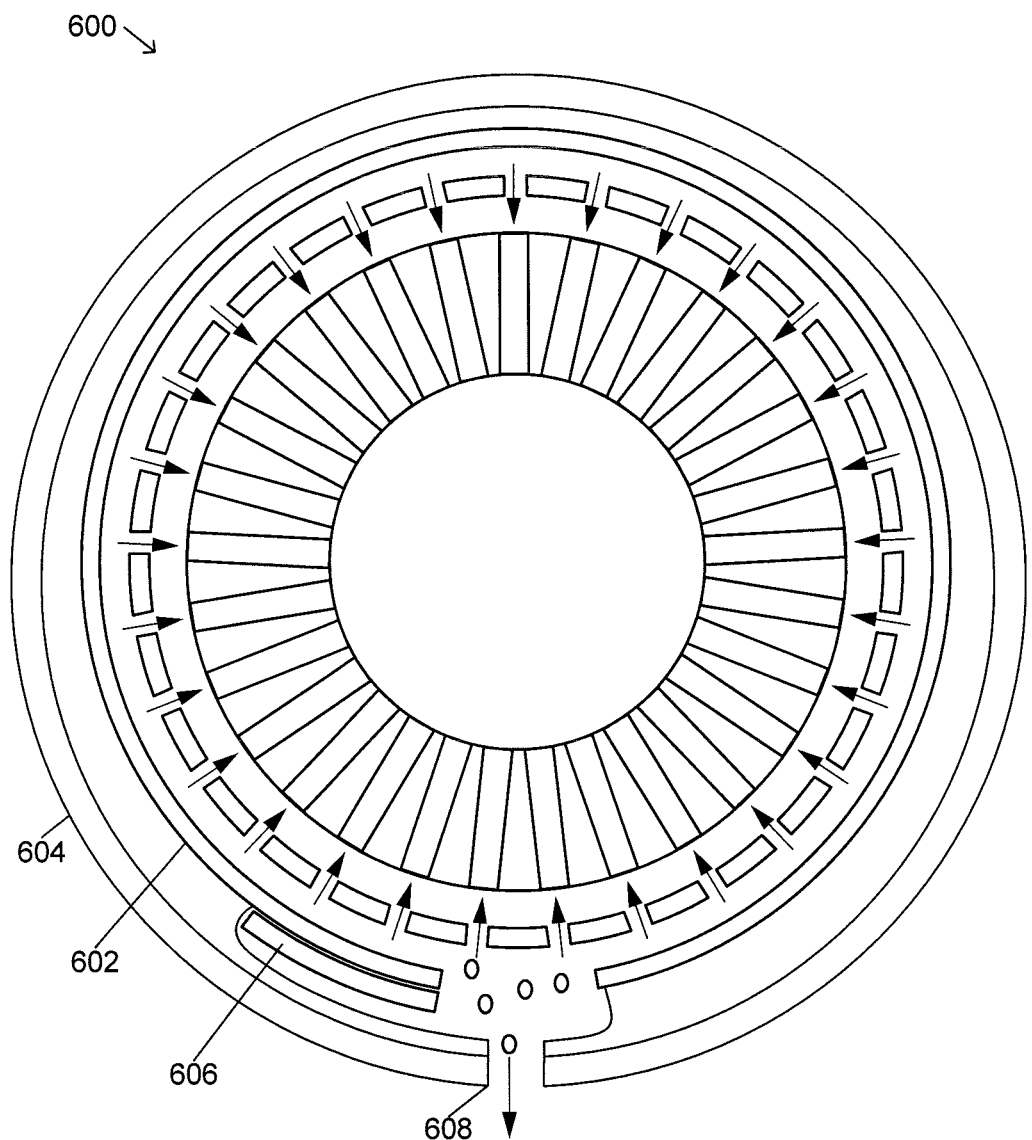
FIG. 6 is an axial view of a turbine section of a gas turbine engine with a debris evacuation door in an open state, in accordance with various embodiments.

Turning to FIG. 6, a cross-sectional view of another high pressure turbine section 600 along axis X-X' illustrates another debris evacuation door 606. Debris evacuation door 606 is a sliding door configuration. Referring to FIGS. 6 and 7, debris evacuation door 606 is shown to be in an open state in FIG. 6 and shown to be in a closed state in FIG. 7.

A nacelle 604 surrounds casing 602 of high pressure turbine section 600. Nacelle 604 provides various features including reducing noise from high pressure turbine section 600. High pressure turbine section 600 is within a gas turbine engine that does not include a bypass flow-path. Thus, debris exiting debris evacuation door 606 must also exit nacelle 604 to be evacuated from the associated gas turbine engine. In order to allow the debris to exit the gas turbine engine, and overboard lead pipe 608 may be positioned between a casing 602 and nacelle 604. Debris that exits debris evacuation door 606 may be channeled to a location outside of turbine section 600 and nacelle 604 via overboard lead pipe 608.

Turning now to FIG. 8A, a cross-sectional view of another high pressure turbine section 800 illustrates another debris evacuation door 804. Debris evacuation door 804 includes a valve 806. Valve 806 may be controlled to be in an open state in which debris may exit support cavity 808. Valve 806 may also be controlled to be in a closed state in which debris may not exit support cavity 808 through valve 806. Valve 806 may include any valve having an open state and a closed state, and may be manually, mechanically or electronically controlled.

Figure 8B:
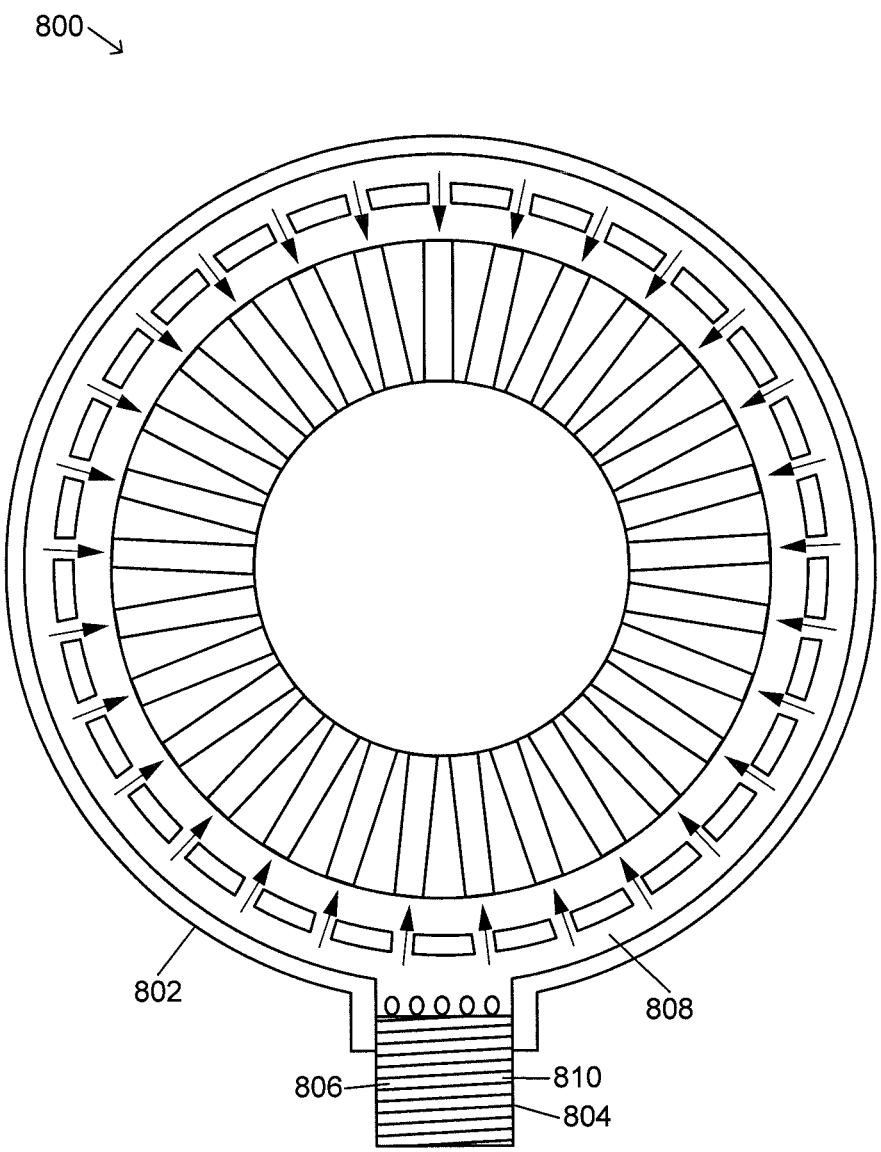
FIG. 8B is an axial view of a turbine section of a gas turbine engine with a plug used as a debris evacuation door in a closed state, in accordance with various embodiments.

In various embodiments, debris evacuation door 804 may instead include a plug 810, as shown in FIG. 8B, that may be manually inserted and/or removed by a technician. In that regard, plug 810 may be removed prior to the gas turbine engine being in a ground idle state such that debris may evacuate support cavity 808. Plug 810 may be reinserted prior to aircraft take off.

In various embodiments, debris evacuation doors 228, 606 and/or valve 806 may be conductive and connected to a power source in such a way as to be switched between a magnetic state and a non-magnetic state. In that regard, debris may be attracted to the debris evacuation doors 228, 606 and/or valve 806 when magnetized. Thus, more debris may be located adjacent the debris evacuation doors 228, 606 and/or valve 806 after the corresponding gas turbine engine has been turned off. Debris evacuation doors 228, 606 and/or valve 806 may be controlled to be in the non-magnetic state prior to being opened such that the additional debris may exit the gas turbine engine than if debris evacuation doors 228, 606 and/or valve 806 were never switched to the magnetic state.

In various embodiments, plug 810 may have a material having magnetic properties, attracting debris to the plug. When the plug is removed, the debris can be wiped off the plug 810.

Figure 9:
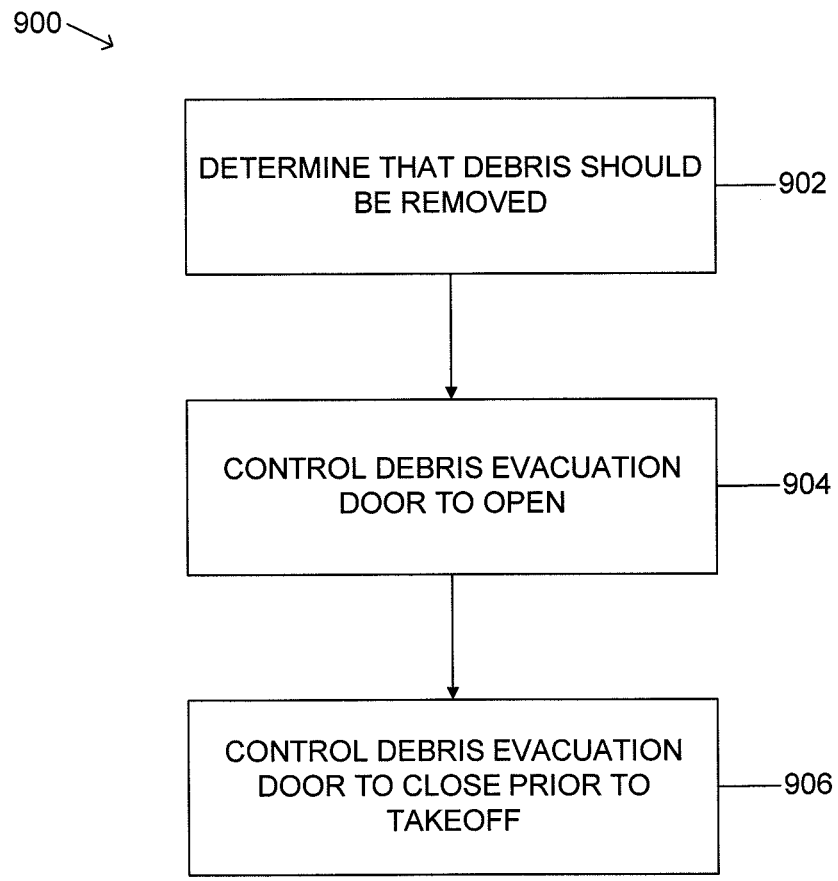
FIG. 9 is a flowchart illustrating a method for using a debris evacuation door to remove debris from a gas turbine engine, in accordance with various embodiments.

Turning to FIG. 9, a method 900 for controlling a debris evacuation door is shown. The method 900 may be performed by a controller of an aircraft, such as controller 230 illustrated in FIG. 2.

In block 902, the controller may determine that debris should be removed from the gas turbine engine. In various embodiments, the controller may determine that debris should be removed in response to receiving input from an input device indicating that a user requests that the debris be removed. In various embodiments, the controller may determine that debris should be removed in response to determining that the gas turbine engine is being initialized or a request has been received to initialize the gas turbine engine. In various embodiments, the controller may determine that debris should be removed after a predetermined amount of time has expired since the gas turbine engine has been turned off.

In various embodiments, the controller may be aware of a planned take off time of an aircraft to which it is attached and may determine that debris should be removed a predetermined amount of time prior to aircraft take off. In various embodiments, the controller may be aware of a planned time at which the gas turbine engine will be initialized and may determine that debris should be removed a predetermined amount of time before the planned initialization, a predetermined amount of time after the planned initialization or at the time of the planned initialization.

In block 904, the controller may control the debris evacuation door to open. For example, the controller may control actuators coupled to one or more hinged door or to one or more sliding door to cause the hinged door or the sliding door to move to an open state. In various embodiments, the controller may control a valve to switch from a closed state to an open state.

In block 904, if the debris evacuation door is designed to be switched between a magnetic and a non-magnetic state, then the controller may also control the debris evacuation door to switch to the non-magnetic state so that the debris can more easily become removed from the debris evacuation door. In various embodiments, the controller controls the debris evacuation door to switch to the non-magnetic state prior to the debris evacuation door being in the open state and, in various embodiments, the controller may control the debris evacuation door to switch to the non-magnetic state after the debris evacuation door has been switched to the open state.

In block 906, the controller may control the debris evacuation door to close prior to aircraft take off. In various embodiments, the controller is designed to cause the debris evacuation door to close after it has been in the open state for a predetermined amount of time. For example, the controller may be designed to cause the debris evacuation door to close 1 minute after the debris evacuation door was switched to the open state, 30 seconds after the debris evacuation door was switched to the open state, 3 seconds after the debris evacuation door was switched to the open state or the like.

In various embodiments, the controller may learn that the aircraft is preparing for takeoff. In response to learning that the aircraft is preparing for takeoff, the controller may control the debris evacuation door to be in the closed state. In various embodiments, the controller may control the debris evacuation door to be in the closed state in response to receiving user input indicating that aircraft take off is upcoming. In various embodiments, the controller may receive user input requesting that the debris evacuation door be closed and may control the debris evacuation door to be in the closed state in response.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for reducing debris in a gas turbine engine comprising:
    a component that defines a component cooling channel for receiving a cooling airflow;
    a casing at least partially enclosing the component; and
    a debris evacuation door coupled to the casing and having an open state in which the debris can exit the casing and a closed state,
    wherein the gas turbine engine includes an axis and wherein the debris evacuation door is axially aligned with an opening to the component.

2. The system of claim 1, wherein the debris evacuation door is at least one of a hinged door, a sliding door, a valve, or a plug.

3. The system of claim 1, wherein the component is at least one of a vane, a vane support, or a blade outer air seal (BOAS).

4. The system of claim 1, further comprising a controller configured to control the debris evacuation door to switch from the open state to the closed state and to switch from the closed state to the open state.

5. The system of claim 4, wherein the controller is configured to control the debris evacuation door to be in the open state for at least a period of time after the gas turbine engine is initialized and before the gas turbine engine is at a ground idle state.

6. The system of claim 4, wherein the controller is configured to control the debris evacuation door to be in the open state for a predetermined amount of time and to be in the closed state in response to the predetermined amount of time expiring.

7. The system of claim 4, further comprising an input device coupled to the controller and configured to receive user input and wherein the controller is further configured to control the debris evacuation door to be in the open state or the closed state based on the user input.

8. The system of claim 1, wherein the casing at least partially defines the component cooling channel.

9. The system of claim 8, wherein a pressure of pressurized air within the component cooling channel is greater than an ambient air pressure outside the casing such that pressurized air within the component cooling channel forces the debris through the debris evacuation door in response to the debris evacuation door being in the open state.

10. The system of claim 1, wherein the debris evacuation door is positioned in a high pressure turbine section of the gas turbine engine, and the debris evacuation door is located at a position along the axis at which the casing is at a largest radial distance from the axis relative to other locations in the high pressure turbine section.

11. The system of claim 1, further comprising a nacelle at least partially enclosing the casing and an evacuation lead pipe coupled between the debris evacuation door and the nacelle and configured to channel the debris from the debris evacuation door through the nacelle to an area outside of the nacelle.

12. The system of claim 1, wherein the debris evacuation door is at least one of magnetized or configured to be switched between a magnetized state and a non-magnetized state.

13. A system for reducing debris in a gas turbine engine comprising:
   a component defining a component cooling channel for receiving a cooling airflow;
   a casing at least partially enclosing the component;
   a debris evacuation door coupled to the casing and having an open state in which debris can exit the casing and a closed state;
   an input device configured to receive user input; and
   a controller coupled to the input device and configured to control the debris evacuation door to switch from the open state to the closed state and to switch from the closed state to the open state based on the user input.

14. The system of claim 13, wherein the debris evacuation door is at least one of a hinged door, a sliding door, a valve, or a plug.

15. The system of claim 13, wherein the controller is further configured to control the debris evacuation door to be in the open state for at least a period of time after the gas turbine engine is initialized and before the gas turbine engine is at a ground idle state.

16. The system of claim 13, wherein the casing at least partially defines the component cooling channel and wherein a pressure of pressurized air within the component cooling channel is greater than an ambient air pressure outside the casing such that pressurized air within the component cooling channel forces the debris through the debris evacuation door in response to the debris evacuation door being in the open state.

17. A method for removing debris from a turbine section of a gas turbine engine comprising:
   determining, by a controller, that the debris should be removed from the turbine section of the gas turbine engine;
   controlling, by the controller, a debris evacuation door coupled to a casing of the gas turbine engine to be in an open state in which the debris can exit the casing in response to determining that the debris should be removed; and
   controlling, by the controller, the debris evacuation door to be in a closed state in response to at least one of receiving a user input or expiration of a predetermined amount of time.

18. The method of claim 17, wherein the determining that the debris should be removed further includes determining, by the controller, that at least one of the gas turbine engine is initializing or a request has been made to initialize the gas turbine engine.

19. The method of claim 17, further comprising controlling, by the controller, the debris evacuation door to switch to a non-magnetized state in response to determining that the debris should be removed.

* * * * *